United States Patent
Belliveau

(10) Patent No.: US 6,969,960 B2
(45) Date of Patent: Nov. 29, 2005

(54) IMAGE PROJECTION LIGHTING DEVICE

(76) Inventor: Richard S. Belliveau, 10643 Floral Park, Austin, TX (US) 78759

(*) Notice: Subject to any disclaimer, the term of this patent is extended or adjusted under 35 U.S.C. 154(b) by 256 days.

(21) Appl. No.: 10/360,185

(22) Filed: Feb. 7, 2003

(65) Prior Publication Data

US 2003/0117090 A1 Jun. 26, 2003

Related U.S. Application Data

(60) Continuation-in-part of application No. 10/231,823, filed on Aug. 29, 2002, now Pat. No. 6,570,348, which is a continuation of application No. 10/002,708, filed on Nov. 1, 2001, now Pat. No. 6,459,217, which is a division of application No. 09/394,300, filed on Sep. 10, 1999, now Pat. No. 6,331,756.

(51) Int. Cl.[7] .......................... H05B 37/00; F21V 17/02
(52) U.S. Cl. ...................................... 315/312; 362/321
(58) Field of Search ................................ 315/318, 316, 315/294, 312, 315, 291; 362/318, 293, 294, 321; 359/291, 294, 830

(56) References Cited

U.S. PATENT DOCUMENTS

| | | | |
|---|---|---|---|
| 5,828,485 A | 10/1998 | Hewlett | 359/291 |
| 5,829,868 A | 11/1998 | Hutton | 362/276 |
| 5,988,817 A | 11/1999 | Mizushima et al. | 353/94 |
| 6,057,958 A | 5/2000 | Hunt | 359/291 |
| 6,188,933 B1 | 2/2001 | Hewlett et al. | 700/19 |
| 6,208,087 B1 | 3/2001 | Hughes et al. | 315/291 |
| 6,219,093 B1 | 4/2001 | Perry | 348/135 |
| 6,364,489 B1 * | 4/2002 | Eguchi | 353/57 |
| 6,466,357 B2 * | 10/2002 | Hunt | 359/291 |
| 6,623,144 B2 * | 9/2003 | Bornhorst | 362/318 |
| 6,769,792 B1 * | 8/2004 | Bornhorst | 362/293 |

OTHER PUBLICATIONS

Catalyst System Brochure.
High End System Product Line 1997.

* cited by examiner

Primary Examiner—Don Wong
Assistant Examiner—Minh Dieu A
(74) Attorney, Agent, or Firm—Walter J. Tencza, Jr.

(57) ABSTRACT

An improved image projection lighting device is disclosed. Commands received by a communications port of the base housing may be acted upon to change zoom and focus values of a zoom and focus lens. A cooling system may be provided which compares an input air temperature of the image projection lighting device to an exiting air temperature to determine if a filter needs service. A video projector may project a first image comprised of first, second, and third separate images and the first separate image can be faded up to project light that is void of an image by a first command received at the communications port.

78 Claims, 7 Drawing Sheets

IMAGE PROJECTION LIGHTING DEVICE

CROSS REFERENCE TO RELATED APPLICATIONS

The present application is a continuation in part of and claims the priority of U.S. patent application Ser. No. 10/231,823, titled "Method and apparatus for digital communications with multiparameter light fixtures", inventor Richard Belliveau, filed on Aug. 29, 2002 now U.S. Pat. No. 6,570,348/20030001523 ("parent application"), which is a continuation of U.S. patent application Ser. No. 10/002,708, filed on Nov. 1, 2001 and issued on Oct. 1, 2002 U.S. Pat. No. 6,459,217/20020047648 ("grandparent application"), which is a divisional of U.S. patent application No. 09/394,300 filed on Sep. 10, 1999, and issued as U.S. Pat. No. 6,331,756 on Dec. 18, 2001 ("original application"). The present application claims the priority of the original application, the grandparent application, and the parent application shown above and these previous applications are incorporated herein by reference thereto in their entirety, as though fully set forth herein.

FIELD OF THE INVENTION

This invention relates to image projection lighting devices.

BACKGROUND OF THE INVENTION

Lighting systems in the prior art are typically formed by interconnecting, via a communications system, a plurality of lighting fixtures and providing for operator control of the plurality of lighting fixtures from a central controller. Such lighting systems may contain multiparameter light fixtures, which illustratively are light fixtures having two or more individually remotely adjustable parameters such as focus, color, image, position, or other light characteristics. Multi-parameter light fixtures are widely used in the lighting industry because they facilitate significant reductions in overall lighting system size and permit dynamic changes to the final lighting effect. Applications and events in which multiparameter light fixtures are used to great advantage include showrooms, television lighting, stage lighting, architectural lighting, live concerts, and theme parks. Illustrative multi-parameter light devices are described in the product brochure entitled "The High End Systems Product Line 2001" and are available from High End Systems, Inc. of Austin, Tex.

A variety of different types of multiparameter light fixtures are available. One type of advanced multiparameter light fixture is an image projection lighting device ("IPLD"). Image projection lighting devices of the prior art typically use a light valve or light valves to project images onto a stage or other projection surface. A light valve, which is also known as an image gate, is a device for example such as a digital micro-mirror ("DMD") or a liquid crystal display ("LCD") that forms the image that is projected. Either a transmissive or a reflective type light valve may be used. U.S. Pat. No. 6,057,958, issued May 2, 2000 to Hunt, incorporated herein by reference, discloses a pixel based gobo record control format for storing gobo images in the memory of a light fixture. The gobo images can be recalled and modified from commands sent by a control console. A pixel based gobo image is a gobo (or a projection pattern) created by a light valve like a video projection of sorts. U.S. Pat. No. 5,829,868, issued Nov. 3, 1998 to Hutton, incorporated by reference herein, discloses storing video frames as cues locally in a lamp, and supplying them as directed to the image gate to produce animated and real-time imaging. A single frame can also be manipulated through processing to produce multiple variations. Alternatively, a video communication link can be employed to supply continuous video from a remote source.

U.S. Pat. No. 5,828,485, issued Oct. 27, 1998 to Hewlett, incorporated herein by reference, discloses the use of a camera with a digital micro mirror equipped light fixture for the purpose of following the shape of the performer and illuminating the performer using a shape that adaptively follows the performer's image. A camera capturing the image (such as a digital camera, which captures an image at least in part by storing digital data in computer memory, the digital data defining or describing the image) preferably is located at the lamp illuminating the scene in order to avoid parallax. The image can be manually investigated at each lamp or downloaded to some central processor for this purpose.

U.S. Pat. No. 5,988,817 to Mizushima discloses a mulit-projection system that can be controlled by a lighting controller that is capable of producing a single image with a plurality of projectors.

IPLDs of the prior art use light from a projection lamp that is sent though a light valve and focused by an output lens to project images on a stage or a projection surface. The light cast upon the stage by the IPLD is then imaged by a camera. U.S. Pat. No. 6,219,093 to Perry titled "Method and device for creating the facsimile of an image", incorporated herein by reference, describes a camera that may be an infrared camera for use with a described lighting device that uses liquid crystal light valves to project an image. "Accordingly the camera and light are mounted together for articulation about x, y, and z axes as is illustrated in FIG. 1" (Perry, U.S. Pat. No. 6,219,093, col. 4, line 59).

In their common application, IPLDs are used to project their images upon a stage or other projection surface. The control of the various parameters of the IPLDs is affected by an operator using a central controller. In a given application, a plurality of IPLDs are used to illuminate the projection surface, with each IPLD having many parameters that may be adjusted by a central controller to create a scene.

IPLDs used in an entertainment lighting system can produce many colorful images upon the stage or projection surface. IPLDs may project images onto the projection surface such as still images, video images and graphic images. The term "content" is a general term that refers to various types of creative works, including image-type works and audio works. Content is typically comprised of still images, video images or loops and computer graphical images.

The Catalyst image projection lighting device manufactured by High End Systems of Austin Tex. incorporates a video projector with a moveable mirror system that directs the images projected by the projector onto the stage or projection surface. A personal computer is used as a server that provides the images to the projector. A lighting controller sends command signals over a communication system to control the selection of images from the server to the projector as well as control the various functions of the video projector and the position of the image on the projection surface. An operator of the lighting controller may modify content before it is projected by sending commands to a personal computer image server. Some examples of the types of modifications to the content are image rotate, negative image, image strobe, image zoom and RGB control. The different types of modifications of the content material can be referred to as "effects". An operator of the lighting control system can send commands to the Catalyst image server over the communication system to adjust or select the effects that modify the content that is projected as an image.

Often times an IPLD projecting an image on a stage or projection surface must transition from a first image that is being projected to a second image. This is accomplished by reducing the RGB (red, green, blue) levels of the first image until the first image fades to black on the projection surface. Next the IPLD content is changed so that the second image to be projected is available to the image control but since the RGB levels are still reduced to achieve a fade to black, the transition from the first image to the second image is not seen by the audience viewing the projection surface. Next the RGB intensity levels are controlled to be slowly raised to reveal the second image. The method of fading down the first image to black by reducing the RGB levels, changing content and fading the second image up to reveal the second image by increasing RGB levels produces a smooth fade up and down transition of the first image to the second image. The transition can be distracting to the audience viewing the transition on the projection surface, however, since for a moment during the transition between the first image and the second image the projection surface was not illuminated by projected light from the IPLD during the fade to black.

U.S. Pat. No. 6,208,087 to Hughes titled Pixel Mirror Based Stage Lighting System and U.S. No. 6,188,933 to Hewlett titled Electronically Controlled Stage Lighting System disclose a technician port servicing an image projection lighting device. The preferred hand held terminal for the technician port is a micropalm having a gray scale display.

The manufacturers of video projectors sometimes used with IPLDs of the prior art, often include a zoom and focus motor system however they are often not robust enough for the frequent adjustments of zoom and focus required for a lighting show. The remote zoom and focus system that is built into the video projector many times does not have any type of positioning by a sensor that would help guarantee that the zoom and focus lens positions are highly accurate when recalling a preprogrammed focus or zoom value from the central controller. U.S. Pat. No. 5,988,817 to Mizushima discloses the use of external motors for zoom and focus on a video projector. The external motors and belts used on the zoom and focus lens incorporated on the sled of the system disclosed by Mizushima require an increase to the overall size of the sled length.

SUMMARY OF THE INVENTION

It is desirable to create a transition between a first image and a second image of an image projection lighting device where during the transition the projection surface is not required to go to black. This can be accomplished in one embodiment of the invention by where either red, green or blue separate colors of an image being projected on the projection surface can be faded up during the transition to create a projected light by the separate color that is substantially void of an image but is a solid color. The projected light, void of an image projected as a solid color can be red, green, blue, white or any color.

There is a need to control a single IPLD by a lighting designer and programmer that is not a technician. The operator controlling the single IPLD will need to preview any content of images stored in the memory of the IPLD as to properly produce the smooth transition of one image to another. The cost of a central controller used to control IPLDs can be cost prohibitive when only one or two IPLDs are required to be controlled. There is a need to produce an IPLD that has a control system built into the IPLD. When operating an image projection lighting device from such a built in control system it is preferred that the image content is previewed with a color monitor display. This can be accomplished in another embodiment of the invention by incorporating a color monitor display with an input keypad to create a stand alone control unit integral to the IPLD.

In another embodiment of the present invention, the zoom and focus motors incorporating electronic position feedback are located within the video projector housing reducing the required size of the lamp housing. The control of the zoom and focus motors and the monitoring of the position of zoom and focus by electronic position sensors is accomplished by a microprocessor system located within the base housing of the image projection lighting device.

The present invention in one embodiment provides an improved image projection lighting device. The image projection lighting device of an embodiment of the present invention can be comprised of a base housing, a yoke, and a lamp housing. The base housing may include or have located therein, a processing system and a communications port. The lamp housing may include or have located therein a video projector, an antireflective aperture, a cooling system, and a filter.

The video projector may be further comprised of a video projector housing, and a zoom and focus lens having zoom and focus values. The zoom and focus lens may be located, in part, within the video projector housing. One or more motors for controlling zoom and focus values may be located within the video projector housing. Commands received by the communications port of the base housing may be acted upon by the image projection lighting device to change the zoom and focus values of the zoom and focus lens. The zoom and focus values are determined by electronic position signals.

The lamp housing may be further comprised of an iris. The cooling system may compare an input air temperature for air entering the of the image projection lighting device to an exiting air temperature for air exiting the image projection lighting device to determine if the filter needs service. The input air temperature may be determined from a signal generated by one or more temperature sensors located within the lamp housing. The image projection lighting device may transmit via the communications port a signal when the filter needs service. The signal may vary a parameter observable by an observer. The parameter may be a projected color, a graphic, or text. The image projection lighting device may further include a memory and the input air temperature and the exiting air temperature may be stored in the memory.

The image projection lighting device may further include a multicolor video display device, which may be a touch screen multicolor video display device. The multicolor video display device may display a signal indicating a service alert, such as a filter service alert.

The image projection lighting device may further include a stand alone control device wherein the multicolor video display device operates as a component of the stand alone control device. The communications port may receive commands for controlling a function of the video projector, such as on or off, selecting a video input, control of a lamp mode, color balance, or the speed of a fan which is part of the cooling system.

The image projection lighting device may transmit service information concerning the video projector from the communications port. The service information may concern the speed of the fan, the remaining life of a lamp, or a version of computer software which runs the video projector.

The filter may be washable and/or a fluorocarbon polymer filter. The fan may be located directly behind the filter to pull cooling air into the lamp housing. A speed of the fan may be variably controlled.

The video projector may project a first image comprised of first, second, and third separate images and the first separate image can be faded up to project light that is void of an image by a first command received at the communications port. The projected light void of an image on the projection surface can be faded down to reveal a second image projected by the video projector by a second command received at the communications port. The first, second, and third separate images may be colored images.

The first separate colored image may be comprised of a plurality of pixels. Each pixel may be in an inactive, partially active, or fully active state, wherein the states of at least two pixels of the plurality of pixels differ.

In one embodiment, a first pixel map of a first separate color having all pixels inactive is faded up by the image projection lighting device incrementally to form a second pixel map for the first separate color of all pixels substantially fully active projecting the first separate color pixels on the projection surface to project the first separate color as light void of an image by commands received at the communications port. The first separate colored image may be faded up by commands received over the communications port and a single DMX channel may be used to provide the commands.

The fade up of any of the first, second, or third separate colored images projected on the projection surface to form projected light that is void of an image on the projection surface can be done by inputting commands into a stand alone controller.

The colored image may be projected in a particular aspect ratio and an aspect ratio identifier may be used so that a fade up of the first, second, and third separate colored images only occurs in the confines of the particular aspect ratio.

The present invention in one embodiment also includes a central controller for a plurality of image projection lighting devices which may be comprised of a visual display device, and an input keypad.

A first input device may be provided for providing commands to be sent from the central controller over a communications system to the plurality of image projection lighting devices for controlling a first separate colored image projected from a first image projection lighting device of the plurality of image projection lighting devices. The first input device may provide an operator of the central controller with the ability to incrementally fade up the projected first separate colored image to form a projected first separate colored light that is void of an image. The first input device can be controlled by the operator to incrementally fade down the first separate colored image projected from the first image projection lighting device until the first separate colored image is not projected with any substantial light created by the first separate color.

Service information, concerning the image projection lighting device, may be transmitted by the image projection lighting device from the communications port to the central controller.

DETAILED DESCRIPTION OF THE DRAWINGS

Figure 1:
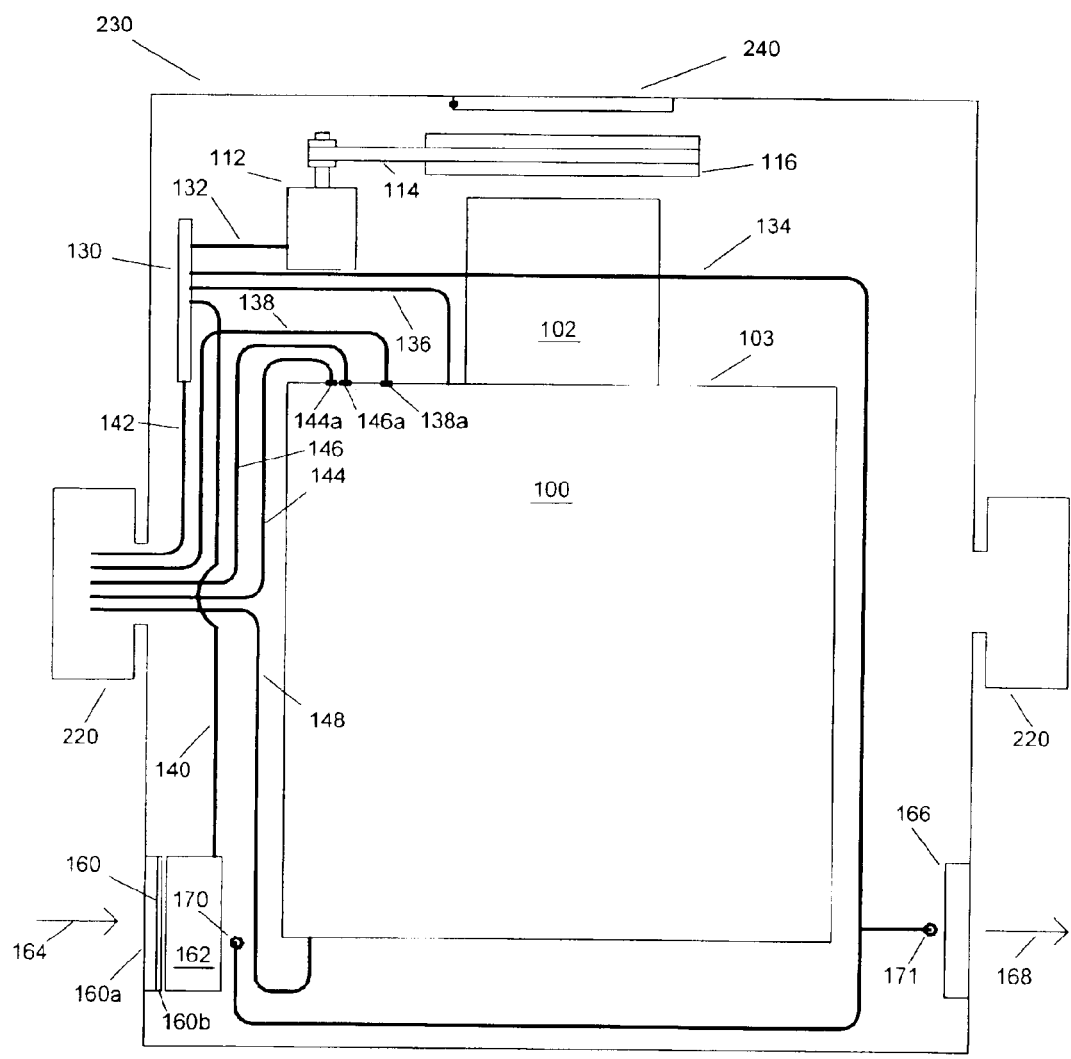
FIG. 1 shows a lamp housing and components therein for an IPLD in accordance with an embodiment of the present invention that incorporates a video projector.

FIG. 1 shows a lamp housing 230 for an image projection lighting device 10 (shown in FIG. 2) of an embodiment of the present invention. FIG. 1 also shows the yoke 220 that rotationally supports the lamp housing 230 and provides a means for tilting the lamp housing 230 in relation to the yoke 220. The motors and bearings that provide the pivotal connection of the yoke 220 to the external housing 230 are not shown for simplification. A video projector 100 with a video projector housing 103 is shown mounted within the lamp housing 230. The video projector 100 incorporates a zoom and focus lens 102. The video projector 100 contains a projection lamp (not shown) to create white light that is separated into separate colors that are directed towards a light valve or light valves (not shown) used to project multicolored images from the projection lens 102. An aperture or window aperture 240 in the lamp housing 230 for emitting the projected light from the projector 100 is preferably made of antireflective glass. The window aperture 240 provides a relatively air tight seal for the area where the projected light exits from the projection lens 102 in the lamp housing 230 and makes sure that the cooling air enters thought a filter 160 in the direction of arrow 164 and exits though an exiting vent 166 in the direction of arrow 168. An iris shutter 116 is driven by a belt 114 and a motor actuator 112. The motor actuator 112 is connected via wiring 132 to a lamp housing interface circuit board 130. The interface circuit board 130 provides motor driving signals to the motor actuator 112 (which may be an iris shutter motor actuator) that with the action of the belt 114 operates iris shutter 116 to open and close.

The interface circuit board 130 is shown connected to wiring 134 that connects to thermal sensors 170 and 171. The sensor 170 provides signals representative of the input ambient air temperature as traveling in the direction of arrow 164. The sensor 171 provides signals representative of the exiting air temperature. The sensors 170 and 171 send signals over the wiring 134 to the interface circuit board 130. The interface circuit board 130 is electrically connected to the wiring 142. Wiring 142 travels through the yoke 220 to the base housing 210, shown in FIG. 3, and connects to the lamp housing circuit board and motor drive interface 318.

Figure 4:
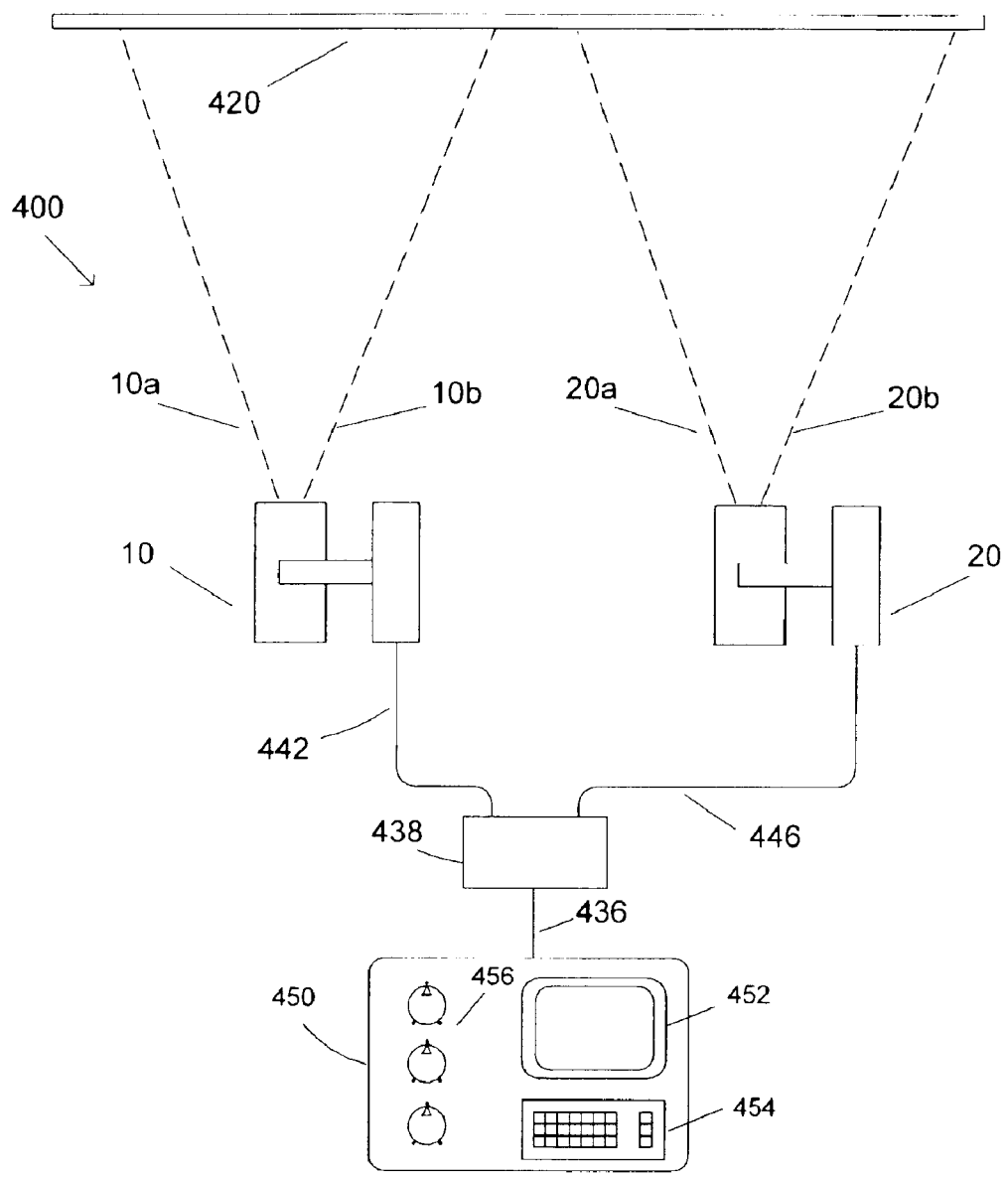
FIG. 4 shows a lighting system using two IPLDs of an embodiment of the present invention and a central controller.
Figure 5:
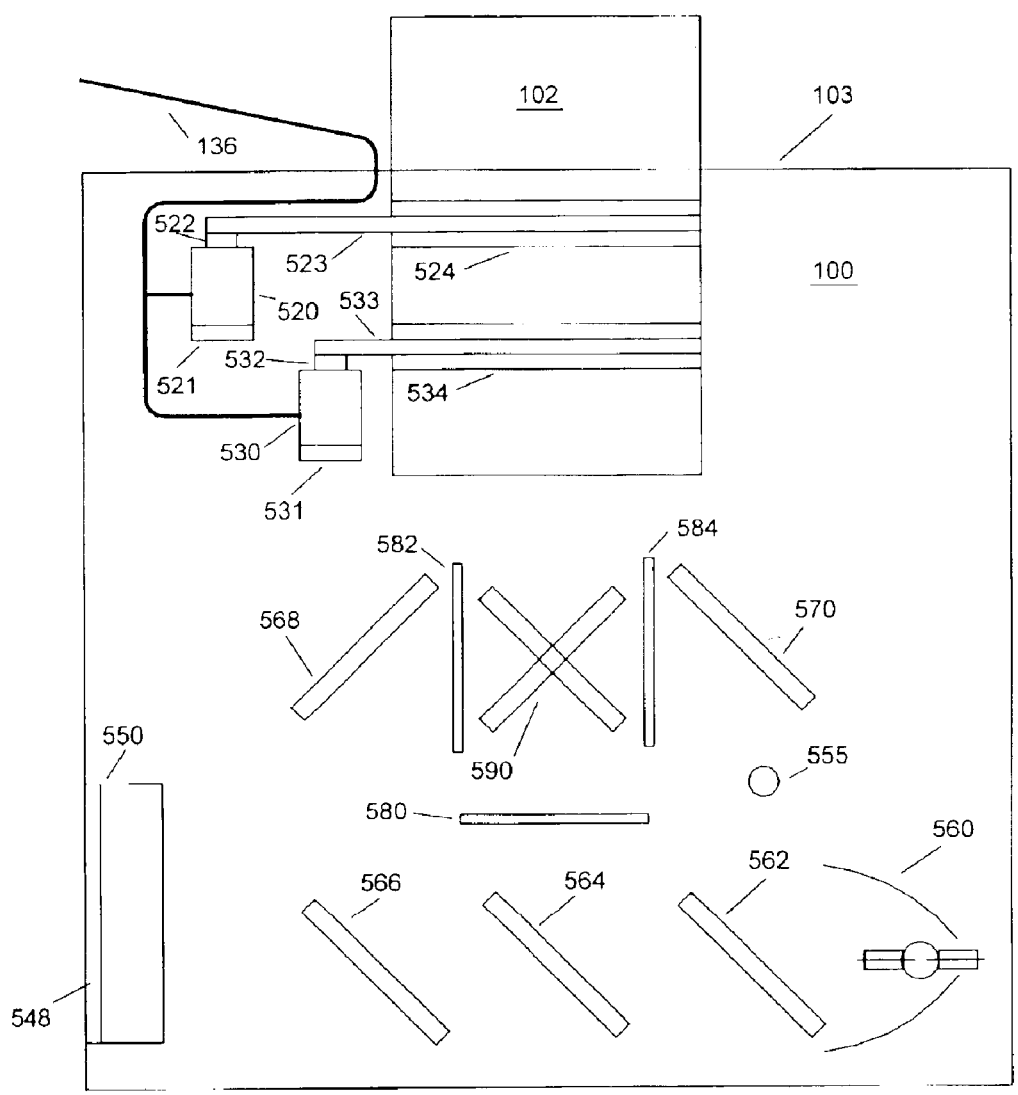
FIG. 5 shows a video projector used with the IPLD of FIG. 2 and incorporates a zoom and focus motor system including electronic position feedback for zoom and focus.

Wiring 136 of FIG. 1 is connected to the zoom and focus motors 520 and 530 and electronic position sensors 521 and 531, through interface circuit board 130, as shown by FIGS. 1 and 5. The motors 520, 530 and the electronic position sensors 521 and 531 are located within the video projector housing 103. The interface circuit board 130 provides the motor driving signals for motors 520 and 530 and also receives the signals from the position sensors 521 and 531 that report the zoom and focus values over wiring 136. Wiring 138 of FIG. 1 is connected to a serial command port 138a of the video projector 100 that allows the functions of the video projector 100 to be remotely controlled by the projector control interface 326 of FIG. 3 and a status of the video projector 100 can also be transmitted from the video projector serial command port 138a through the wiring 138 to the projector control interface 326. The serial command port 138a of the projector 100 is used to control the various functions of the projector 100 such as on and off switching of the projector 100, selecting a video input to the projector 100. Video inputs 144a and 146a to the projector 100 may be supplied, for example, from devices connected to wiring 144 or 146. The serial command port 138a may also control functions such as to control the color balance of the projector 100, speeds of an internal fan, such as the internal fan 550 shown in FIG. 5, the lamp mode such as normal or economy by commands received at the serial command port 138a as well as send projector status of service information from the serial command port 138a of the video projector 100 via wiring 138, through yoke 220 to the projector control interface 326, shown in FIG. 3, such as fan speed, lamp hours, the present lamp mode, the internal temperatures and a software version for computer software running the projector 100. Lamp hours service information describes operating hours on the lamp or the percentage of hours of lamp life left on the lamp. Commands to control the functions of the video projector 100 of FIG. 1 can be sent from the central controller 450 of FIG. 4 and received by the communications port 311 or 312 of FIG. 3 to control the functions of the video projector 100. These projector control commands received by the communications ports 311 or 312 are sent to the processor 316, shown in FIG. 3, where in accordance with the operational code stored in the memory 315, these commands are processed and sent to the projector control interface 326 that in turn sends the commands to the projector serial command port 138a, shown in FIG. 1, over the wiring 138 to control the functions of the projector 100. Also service information can be sent from the projector 100 serial command port 138a, shown in FIG. 1, over the wiring 138 to the projector control interface 326. This service information can then in turn be sent to the processor 316 where it is processed in accordance with the operational software stored in the memory 315. This service information can also be sent to the communications ports 311 or 312 to be transmitted over the communications system to the central controller 450 of FIG. 4 and to be viewed by an operator on a display 452. The projector service information received by the central controller 450 of FIG. 4 on the display 452 can be read by the operator and used to help make decisions as to when projector service should occur. As shown in FIG. 1, a cooling fan 162 is connected by the wiring 140 to the interface circuit board 130. The interface circuit board 130 routes driving signals to the fan 162 that can control the fan 162 to be on or off as well as variably control a speed of the fan 162. The fan 162 is located behind a filter 160 and is used to pull outside air into the lamp housing 103 in the direction of arrow 164 through the filter 160. The filter 160, the fan 162, the exit vent 166, and the thermal sensors 170 and 171 are part of a cooling system. An inlet side 160a of the filter 160 is exposed to the air on the outside of the lamp housing 230 and is used to filter the outside air coming into the lamp housing 230 so that the video projector 100 is protected from theatrical haze and debris. The filter 160 is used to prevent airborne particles from entering the lamp housing 230 that are larger than 3 microns and the filter 160 is easily accessible by service personnel. The filter 160 is made of a fluorocarbon polymer that is washable with a jet of water that is applied to the air output side 160b of the filter 160 permitting the filter 160 to be pressure washed. The filter 160 may be a type of filter such as a washable fluorocarbon polymer filter that filters below 3 microns, such as a filter made by CleanStream (trademark) a division of W. L. Gore & Associates, Elkton, Md. In one embodiment a filter 160 may be used which can filter particles below 3 microns from entering the lamp housing 230 and yet be washable by service personnel with ordinary pressurized water. A washable filter for the filter 160 prevents potential downtime of the image projection lighting device 10 due to the filter 160 being saturated with dirt, fog or other debris, since a replacement filter for filter 160 would then not be required.

The air drawn through the filter 160 and then through the fan 162 is used to bring cooling air to the projector 100. The input air may be directly vented into the projector 100 through an input air vent 548 of FIG. 5 of the projector 100. Cooling air is input to the lamp housing 230 to provide cooling airflow to the inside of the lamp housing 230. The cooling air exits through a vent 166 in the direction of arrow 168.

Figure 3:
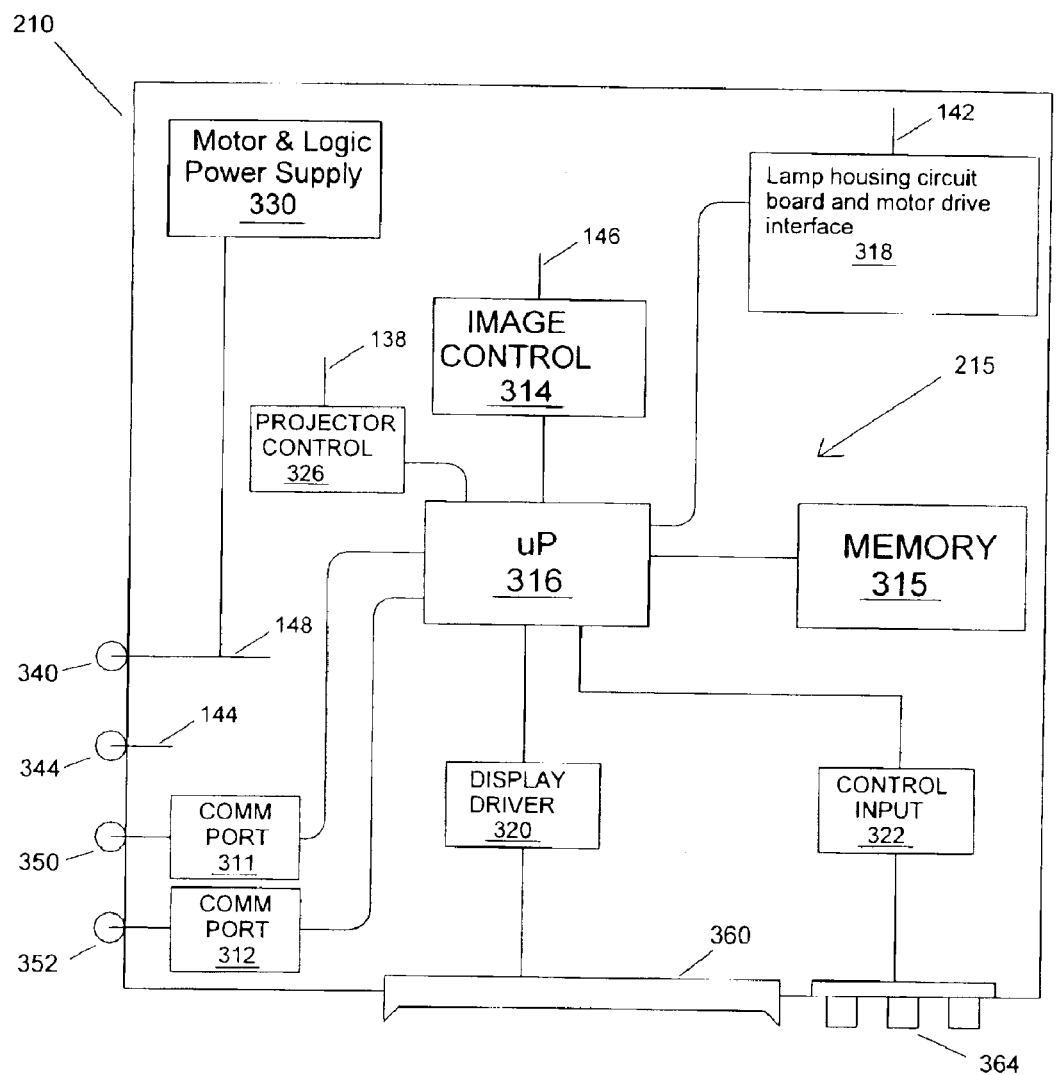
FIG. 3 shows a block diagram of components within the base housing of FIG. 2.

Wiring 146 connects to a video input 146a of the video projector 100 and is routed through the yoke 220 and is connected in the electronic housing 210, shown in FIG. 3 to the image control 314. The video input 146a, supplied by the image control 314 via wiring 146 through yoke 220, may be digital or analog such as an RGB (red, green, or blue) signal, component or composite video. Wiring 144 connects to an additional video input 144a of the projector 100, and is routed through the yoke 220, and is connected in the base housing 210, shown in FIG. 3, to the external connector 344. Wiring 148 provides power to the video projector 100 from an outside power source like a power line from the external connector 340 shown in FIG. 3, and through the yoke 220 shown in FIG. 1. Connector 340 is connected by any suitable means to an AC power source. The motor and logic power supply 330 also supplies power for the motors such as pan and tilt (not shown), the iris shutter motor 112 of FIG. 1, zoom and focus motors 520 and 530 of FIG. 5 and the control system 215, shown in FIG. 3, in the base housing 210.

Figure 2:
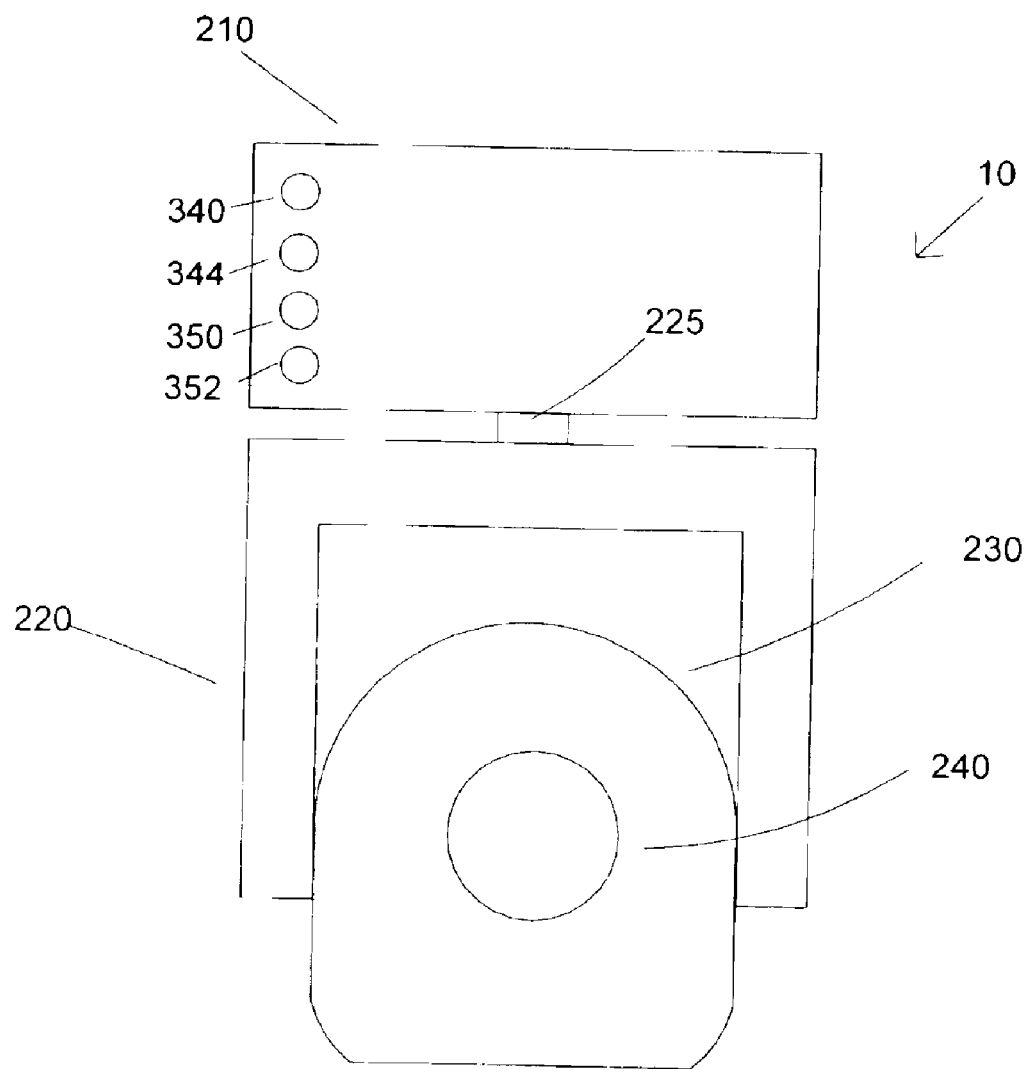
FIG. 2 shows an external view of the image projection lighting device of which the lamp housing and components of FIG. 1 is a part.

FIG. 2 shows an external view of the image projection lighting device 10. The base housing 210 of FIG. 2 is also shown in FIG. 3. The power connector 340 is shown for connecting to a source of power. The external video input connector 344 allows for connection of video input 144a of the projector 100 from an outside source. External connector 350 connects outside communication from a communication system such as a central control system 450 of FIG. 4 to communications port 311. Central control system 450 can operate a plurality of image projection lighting devices, such as image projection lighting devices 10 and 20 of FIG. 4. Image projection lighting device 10 may communicate with the central control system 450 via the communications port 311, shown in FIG. 3. External connector 352 may connect communication from an additional communication system, similar to central controller 450 of FIG. 4 for operating a plurality of image projection lighting devices to a second communications port 312. A description of multiple communication systems for multiparameter lights and the advantages thereof is provided in U.S. Pat. No. 6,331,756 entitled "Method and Apparatus for Digital Communications with Multiparameter Light Fixtures," which issued Dec. 18, 2001 and in U.S. Pat. No. 6,459,217, entitled "Method and Apparatus for Digital Communications with Multiparameter Light Fixtures", which issued on Oct. 1, 2001 and these patents are incorporated herein by reference in their entirety.

A bearing 225 shown in FIG. 2 allows for panning of the yoke 220 in relation to the base housing 210. A pan motor (not shown for simplification) drives the panning of the yoke 220 for rotation in relation to the base housing 210 and the pan motor is powered by control signals from the motor drive interface 318 of FIG. 3. The yoke 220 is connected by bearings (not shown for simplification) to the lamp housing 230. The lamp housing 230 is driven to rotate in relation to the yoke 220 by a tilt motor (not shown for simplification). The tilt motor is powered by control signals from the motor drive interface 318 shown in FIG. 3. An antireflective glass aperture 240 is shown in FIG. 2, for exiting the projected light from the lens 102 of projector 100 from the lamp housing 230, shown in FIG. 1.

FIG. 3 is a block diagram of components within the base housing 210 of the IPLD 10. A control system 215, shown in FIG. 3, for remote control of the IPLD 10 may be constructed of at least a processor 316 that may be termed a processing system and which may include multiple processors or discrete components that are used to process data. The control system 215 of FIG. 3 also may include a separate memory 315 or the control system 215 may include memory which is part of the processor 316. An external circuit board and motor drive interface 318 for sending control signals to motors and an image control interface 314 may be included as part of the control system 215, shown in FIG. 3. External connectors 340, 344, 350 and 352 are shown mounted to the base housing 210 for connecting a source of power, an external video input, and first and second communications systems, respectively. Connector 352 connects to communications port 312. The connector 352 may be connected to an external communications system such as the communications system including components 442, 436 and 438 shown in FIG. 4, wherein the communications system may provide address and command signals as well as content. The communications port 312 sends the received address, command signals and content to the processor 316 where they may be acted upon to control the parameters of the IPLD 10 and provide the content to the image control 314 to be projected by the projector 100 or to be stored into the memory 315. The communications port 312 may also be used to transmit content stored in the memory 315 to the communications system, such as the communications system including components 442, 436 and 438 shown in FIG. 4, to other IPLDs, such as IPLD 20 shown in FIG. 4, or to a central controller, such as central controller 450, as well as transmit service information to the central controller 450 or a service device. A suitable system, method and apparatus for communicating image content, from a central controller to one or more IPLDs and between IPLDs under control of a central controller are described in my pending U.S. application Ser. No. 10/090,926 entitled "Method, Apparatus and System for Image Projection Lighting," which was filed Mar. 4, 2002 and hereby is incorporated herein by reference in its entirety. The connector 350 connects to communications port 311. The connector 350 may be connected to an external communications system providing address, commands and content such as the communications system including components 442, 436 and 438 of FIG. 4. The address and commands signals received by the communications port 311 are sent to the processor 316 where they may be acted upon to control the parameters of the IPLD 10 of an embodiment of the present invention. The communications port 311 may also transmit data to the communications system, such as the system of FIG. 4, including components 442, 436 and 438, such as service information. Service information data transmitted over the communication system may be the projector lamp life, the status of the air filter 160, the internal temperatures of the projector 100 or the lamp housing 230, the serial number of the projector, the version number of the operating code stored in the memory 315 or the version of the operating code stored in the projector 100. The communications ports 311 and 312 may be individual devices acting as communications ports or they may be part of the processor 316. The communications ports may be any device connected to an external communications system for receiving and transmitting digital commands and transferring digital data.

The processor 316 is connected to the memory 315. The memory 315 may be any type of memory capable of storing information. The memory 315 may contain the operating system of the IPLD 10 as well as content to be projected by the projector 100. The processor 316 is connected to the projector control interface 326, The projector control interface 316 is connected to the serial command port 138a of the video projector 100. When the appropriate commands are received by the communications ports 311 or 312 the processor 318 may act in accordance with the operating software stored in the memory 315 by sending command signals to the projector control interface 326 to operate various functions of the projector 100. The processor 316 may also receive from the projector control interface 316 service information that in turn the processor 316 forwards to the communications port 311 or 312 for transmission over a communications system, such as the communications system including components 438, 436 and 442, to a central controller, such as central controller 450, or other receiving device requiring the desired information.

The image control system 314 is connected to the processor 316. The image control system 314 provides video output to the projector 100, via the wiring 146. The image control system 314 may be a computer video card used for the manipulation of the content before it is projected by the projector 100. The image control system 314 is capable of manipulation of pixel maps created by the content that is received by the image control system 314. The processor 316 may receive various commands over a communications system through communications ports 311 or 312 to alter the content. The content may be altered by the image control system 314 in various ways such as rotation of the image, keystone correction, image intensity, and as well as independent control of the pixels for the separate colored images that form a colored image.

As shown in FIG. 3, the processor 316 is also connected to a display driver 320 for providing image control of a multicolor video display device 360. The multicolor video display device 360 is preferably an LCD multicolored display capable of displaying multicolored images of the content stored in the memory 315 or the content sent over a communications system, such as the communications system including components 438, 436 and 442 of FIG. 4, through one or both of communications ports 311 or 312. It is desirable that the multicolor video display device 360 be capable of displaying content for the purpose of programming IPLD parameters as well as what content will be projected by the projector 100. As shown by FIG. 3, an input keypad 364 is connected to a control input interface 322. The input keypad 364 is used by an operator or lighting director to control the parameters of the IPLD 10 of an embodiment of the present invention and select what content is to be projected by the projector 100 as well as selecting what content is previewed on the multicolored video display device 360. The control input interface 322 sends the commands inputted by the input keypad 364 to the processor 316 where they can be acted upon based on the operational software stored in the memory 315. The input keypad 364 and the multicolor video display device 360 can be components of a stand alone control system or controller.

The lamp housing circuit board and motor drive interface 318 is shown connected to the processor 316 in FIG. 3. The interface 318 provides control signals to the motors used for pan and tilting of the lamp housing 230 in relation to the base housing 210 and the yoke 225, shown in FIG. 2. (connections and motors not shown for simplification). The interface 318 provides control signals to the motor actuator 112, shown in FIG. 1, as well as to the focus motor 530 and zoom motor 520, shown in FIG. 5, through interface circuit board 130. The lamp housing circuit board and motor drive interface 318 also sends to the processor 316 temperature information provided by the temperature sensors 170 and 171 via interface circuit board 130 and wiring 134 shown in FIG. 1. The lamp housing circuit board and motor drive interface 318 controls the fan 162 to be on or off and with variable speed through the interface circuit board 130, and through wiring 140

FIG. 4 shows a lighting system 400 and IPLDs 10 and 20. The IPLD 20 may be the same as the IPLD 10 in accordance with an embodiment of the present invention. The central controller 450 is shown and is comprised of a video display device 452, an input keypad 454 and input devices 456. A communications cable 436 is shown connected between the central controller 450 and a communications interface 438. Communications interface 438 is shown connected by communication cables 442 to IPLD 10 and by communication cable 446 to IPLD 20. IPLD 10 is shown projecting on a projection surface 420 and the projection field is indicated by dashed lines 10a and 10b. IPLD 20 is shown projecting on a projection surface 420 and the projection field is indicated by dashed lines 20a and 20b. Although only two IPLDs are shown for the lighting system 400 of FIG. 4 many more IPLDs can be interconnected to form the lighting system, such as lighting system 400.

FIG. 5 shows some components of the video projector 100. In FIG. 5, the wiring 136 is shown connected to the zoom and focus motors 520 and 530 respectively and to position sensors 521 and 531. A zoom motor shaft 522 drives a belt 523 that rotates a zoom adjustment ring 524 on the zoom and focus lens 102 and adjusts the zoom value of the lens 102 that increases or decreases the size of the projected image on a projection surface, such as the projection surface 420 of FIG. 4. The focus motor shaft 532 drives a belt 533 that rotates a focus adjustment ring 534 on the zoom and focus lens 102 adjusting the focus value of the lens 102 that changes the focus of the projected image on a projection surface, such as the projection surface 420 of FIG. 4.

The zoom and focus motors 520 and 530 have respective attached position sensors 521 and 531 used for sensing the rotational position or number of revolutions of the motor shafts 522 and 532 respectively as known in the art. The electronic position signals generated by the position sensors 521 and 531 provide electronic position signals as to the values of zoom and focus and the electronic position signals are used by the control system 215 of FIG. 3 to determine how the motors 520 and 530 affect the zoom and focus values as they are driven. The zoom and focus motors 520 and 530 and respective position sensors 521 and 531 are contained within the housing 103 of the video projector 100 to reduce the size of the lamp housing 230 of FIG. 1. Wiring 136 exits the housing 103 and supplies the motor control signals to the motors 520 and 530 through the lamp housing interface circuit board 130, shown in FIG. 3. The wiring 136 also carries the electronic position signals from the sensors 521 and 531 to the lamp housing interface circuit board 130. The lamp housing interface circuit board 130, shown in FIG. 1, via wiring 142, sends the electronic position signals with zoom and focus values to the interface 318 so that the processor 316 using operational code stored in the memory 315 can ensure that particular zoom and focus values are achieved when a command is sent from the central controller 450 of FIG. 4 to control the zoom and focus parameters to particular values. When the commands are sent from the central controller 450 to change a value of zoom or focus to a particular value the communications interfaces 311 or 312 receive the command and send the command to the processor 316. The processor 316 then operates with the operational code in the memory 315 to send signals to control the motors 520 or 530 via the interface 318. The interface 318 through wiring 142 sends motor control signals to the lamp housing interface circuit board 130 that in turn sends the motor control signals to the motors 520 or 530. The zoom motor 520 and the focus motor 530 may be driven by the motor control signals to change the values of the zoom and focus lens 102 to a value that is determined by the electronic position signals from the sensors 521 and 531, respectively.

The projector 100 of FIG. 5 also shows three light valves 580, 582 and 584. Color separating filters 562, 564 and 566 separate white light generated by the lamp 560 into the separate colors of red, green and blue and direct the colored light towards light valves 580, 582 and 584. Reflector 570 reflects the red light separated by filter 562 towards the light valve 584. Reflector 568 reflects the blue light separated by filter 566 towards the light valve 582. The red, green and blue separated colored light passes through the light valves where an image can be formed at each light valve and the colored light images are combined by a combining system 590 so that all three separate colors and their respective images can be collected by the zoom and focus lens 102 as known in the are of video projectors. The video projector 100 optical system which is shown by way of example, uses transmissive light valves such as the light valves 580, 582 and 584 and a color separation system for separating the white light from the lamp 560 into red, green and blue light. The video projector 100 could use reflective light valves and or a color separation system that separates the white light from the lamp 560 into separate colors with a spinning color wheel as known in the art.

The projector 100 of FIG. 1 is equipped with an internal temperature sensor 555 shown in FIG. 1, mounted within the video projector housing 103. This temperature sensor 555 is used by the manufacture of the projector 100 to sense when the projector 100 is at a critical operating temperature and if so, to shut the projector lamp off and/or to provide an over temperature warning. The temperature reading of temperature sensor 555 within the video projector housing 103 can be reported from the projector serial command port 138a over wiring 138, through the yoke 220 shown in FIG. 1, to the projector control interface 326. The filter 160 of the lamp housing 230 shown in FIG. 1 can become saturated with debris or dust over a period of time with usage of the IPLD 10. During a performance event it is critical that the projector 100 not reach a critical operating temperature and shut the lamp off resulting in a distraction or a cancelled performance. The temperature of the input air as read by sensor 170 can be compared by the processor 316 of FIG. 3, to the temperature of the exiting air as determined by thermal sensor 171 to determine if the cooling system of the lamp housing 230 is working appropriately. This is because as the filter 160 becomes more saturated with debris the difference in temperature signals between the input air temperature and the temperature as determined by the exiting air sensor 171 will increase due to the heat generated by the projector lamp 560 of FIG. 5 of the video projector 100. The processor 316 using operational software in the memory 315 can determine when the difference between the signals of sensor 170 and the signals of sensor 171 is too high and send a filter service alert signal to the communication interfaces 311 and or 312 for transmitting the filter service alert signal over the communication system to the central controller 450. Since a filter is not likely to be changed during a performance event in progress the difference values between the sensors 170 and 171 may be stored in the memory 315 of FIG. 3. This way the status of the filter 160 can be determined by the processor 316 from the memory 315 and communicated over the communications system, including 442, 436 and 438, upon the next initialization (power up) of the product or by a request command from the central controller 450. The filter alert or status of the cooling system or filter 160 may also be sent to the multicolor video display device 360 of FIG. 3 or the IPLD 10 may be instructed by the processor 316 to provide a visual filter alert by varying a parameter of the IPLD 10 that can be observed by an observer. For example the IPLD 10 may project images from the projector 100 of FIG. 1 during the initialization of the IPLD 10 to project a red color with the text "filter alert" or "service filter" or any text, graphics or colors to be observed by an operator or technical person on the projection surface 420 of FIG. 4 that warns the operator or technical person that the filter 160 is in need of service. The initialization process, starting up or homing up of the IPLD 10 occurs just after the IPLD 10 of FIG. 4 is connected to power. The IPLD 10 of FIG. 4 may also simply refuse to operate normally after initialization by for example not projecting light or images on the projection surface 420 of FIG. 4 from projector 100 to bring attention to the operator that there is a need for service. By refusing to operate normally, the IPLD 10 will bring the needed attention to the operator before the performance event starts. The IPLD 10 may also display other types of service alerts one of which could be a filter service alert on the multicolor video display device 360.

An operator of the IPLD 10 of an embodiment of the present invention, may use the multicolor video display device 360 and the input keypad 364 as a stand alone control device. Instead of the input keypad 364, the multicolor video display device 360 may also be a touch screen multicolor video display device that accepts input commands from the operator while touching the surface of the multicolor video display device 360. A multicolor video display touch screen for the multicolor video display device 360 can be constructed of resistive touch technology, capacitive touch technology or optical touch technology as known in the art of video touch screen displays. The input keypad 364 allows commands to be inputted that vary the parameters including the content to be projected of the IPLD 10. The operator may create with the multicolor video display device 360 a list of cues or scenes that can be triggered over a certain amount of time. The IPLD 10 can then be commanded by the operator operating the stand alone control system to play back the list of cues or scenes in a playback mode. In the playback mode the IPLD 10 may respond to each cue by changing parameters that have been preprogrammed by the operator. Each cue may involve a change of content material that is projected by the projector 100 and may involve several changes of content. The content may be provided from the memory 315. Using the multicolor video display device 360 the operator can preview the content stored in the memory 315 and select what content is to be projected by the projector 100 during each cue. Several IPLDs can be used in a performance event each using their respective stand alone control so that an expensive central controller is not required.

The IPLD 10 of FIG. 2 may receive commands sent from the central controller 450 of FIG. 4 to adjust RGB levels for the image as created by the content being projected by the projector 100. A colored image as created by the content being projected from the projector 100 is comprised of red, green and blue separate colored images. The content provides data as to which pixels of the red, blue or green separate colored images as projected on the projection surface are fully active, partially active or inactive in the colored images projected. The commands sent from the central controller 450 may fade up a colored image on the projection surface 420 of FIG. 4 that is made up of active, partially active and inactive pixels so that the fade up creates a projected light on the projection surface 420 with all pixels active that is void of an image.

The adjustment of the pixels of the red, green and blue separate colored images for the IPLDs 10 and 20 of FIG. 4 include fading up the inactive and partially active pixels of the red, green and blue separate colored images of a colored image as created by the content being projected so that the red, green and blue separate colored images may be faded up to have substantially all pixels fully active creating projected light on the projection surface 420 of FIG. 4 that is void of an image.

Figure 6A:
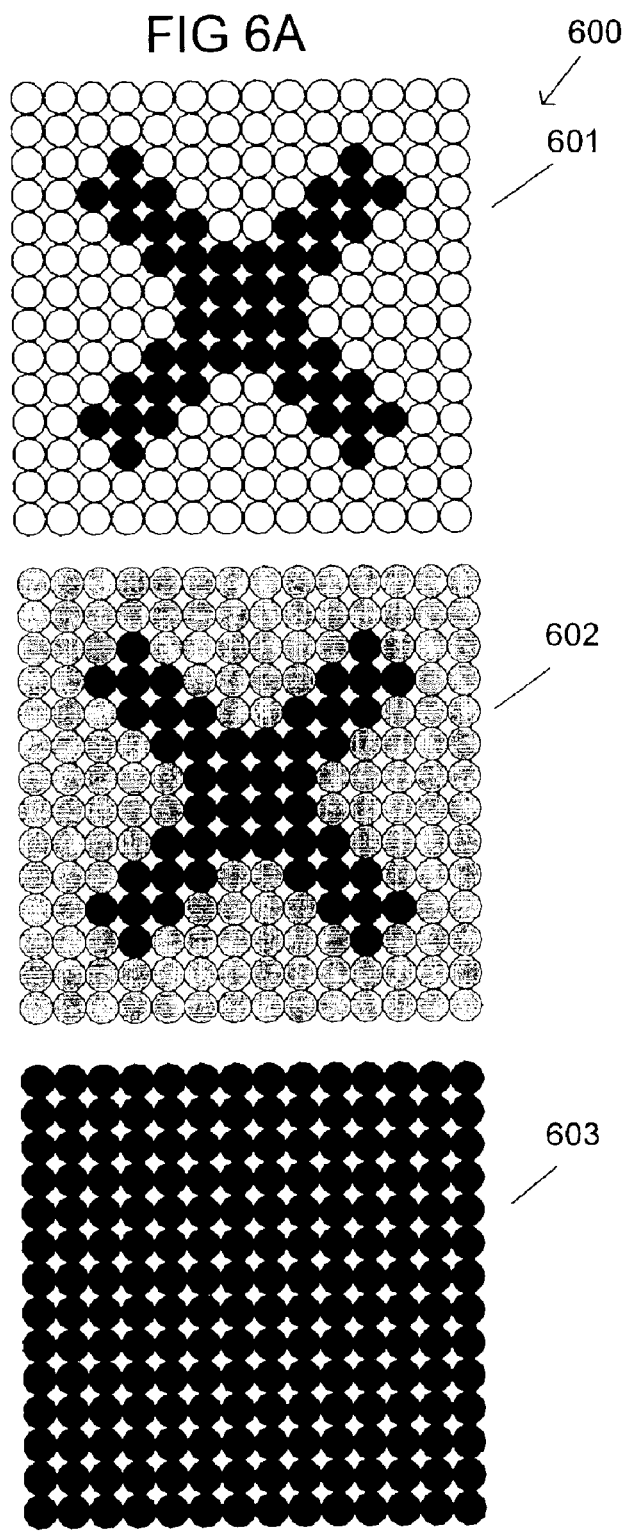
FIG. 6A shows three states of a separate color that projects an X shaped image that has been faded up by incorporating an embodiment of the present invention.
Figure 6B:
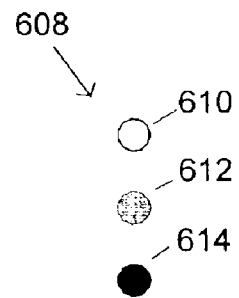
FIG. 6B shows a pixel in three different states.

FIG. 6A shows a diagram 600, which includes diagrams 601, 602, and 603. The diagrams 601, 602, and 603 depict illustrative examples of how three states of a fade up of a separate colored image (that could be red, green or blue) would look on a projection surface. By way of example, diagram 601 depicts a red separate colored "X" shaped image on the projection surface 420. A diagram 608 of FIG. 6B shows three different states of an example pixel. The pixel shown as 610 may be in an inactive state meaning no light is projected by this pixel on the projection surface. The pixel shown as 612, may be the same pixel as 610, but which has now changed to a partially active state. A partially active state means that at least some light is projected by the partially active pixel on the projection surface but the pixel in not fully active. The pixel shown as 614, may be the same pixel as 610 and 612, but has now changed to a fully active, or substantially fully active state. In the fully active state, the pixel projects substantially maximum light on the projection surface.

The diagram 601 is made up of a plurality of pixels, each of which may be in one of the two states such as shown for 610 and 614 of FIG. 6B. Some of the plurality of pixels are in a fully or substantially fully active state and some of the plurality of pixels are in an inactive state. In the diagram 601, the pixels that form the "X" shape are fully active, while the pixels outside the "X" shape are inactive. The pixels of the "X" shape would be a particular color, such as red. The separate colored "X" image shown in the diagram 601 may be projected on the projection surface 420 by both IPLDs 10 and 20 and a fade up of the separate colored "X" image to project light void of an image could be accomplished by either of IPLDs 10 or 20. The operator of the central controller or central control system 450 may by means of a keypad 454 select which of the IPLD 10 or 20 of FIG. 4 to adjust the red separate X shaped colored image of diagram 601. The operator first enters the address of the desired IPLD (for example IPLD 10) by inputting, for example via keypad 454, the correct address of, for example, IPLD 10. The address is sent over communications cable 436 to the communications interface 438. The communications interface 438 may be a network hub or switch as known in the computer art. For some communications systems the communications interface 438 may not be required. The communications interface 438 sends the desired address as input by the operator of the central controller 450 to the IPLDs 10 and 20 over respective communications cables 443 and 446, respectively. The address is received by the IPLD 10 at one of the communication ports 311 or 312 of FIG. 3 and the appropriate communications port of 311 or 312 routes the address data to the processor 316 where it is compared to the operating address of IPLD 10 stored in the memory 315. If the address as input by the operator of the central controller 450 matches the operating address stored in the memory 325 of IPLD 10, the IPLD 10 will then respond to commands sent by the operator specifically to the IPLD 10.

The operator of the central controller 450 of FIG. 4 may next decide to fade up the red "X" shaped separate colored image of the diagram 601 of FIG. 6A. Commands are sent from the central controller 450 of FIG. 4 as input by the operator that may incrementally adjust the pixels of the separate color to fade up the red separate color to a state such as that shown by the diagram 602. The diagram 602 shows that the pixels which were formerly inactive in diagram 601 and were shown as clear outlined circles in diagram 601 are now partially active. Pixels shown as a gray color in diagram 602 represent a medium intensity on the projection surface 420 of FIG. 4. The fully active projected pixels on the projection surface 420 as shown by diagram 602 still show the "X" shaped image but the partially active pixels, surrounding the X shaped image show a reduced contrast as established between the fully active pixels and the partially active pixels. The partially active pixels (represented by the gray colored pixels in diagram 602) can gradually become fully active to match the fully active pixels creating the "X" shaped image by further commands sent from the central controller 450. This can be shown as state or diagram 603 of FIG. 6A. In the diagram 603, the partially active pixels have now changed to fully active pixels, producing substantially the maximum red light projected upon the projection surface 420 of FIG. 4. Using this method a separate colored image (red, green or blue), can be adjusted or faded incrementally by commands sent from the central controller 450 from an original separate image such as the X shaped image shown in the diagram 601 to project light on the projection surface that is substantially void of an image as shown in the diagram 603 on the projection surface 420. While only three states or diagrams 601, 602 and 603 are shown there could be many more incremental states between the state or diagram of 601 and 603. The three separate colored images of red, green and blue that typically form a full colored image being projected on a projection surface by IPLD 10 can each be faded up to project separate colored light that is "void" of an image creating a projected white colored light that is void of an image. This allows for a fade up to a white colored light on the projection surface that is void of an image from a colored image projected on the projection surface. A fade up from a multicolored image as created by the content being projected can also result in a fade up to any solid color as for example a solid red separate color combined with a solid blue separate color results in a magenta solid color. The green separate color when creating the solid magenta color would have its intensity reduced so that the solid green separate color has all of its pixels inactive and not projecting on the projection surface. The fading up of an image created by the content being projected to project a solid colored light that is void of an image results in less distraction to the audience as it is not necessary to fade to black during a transition between a first image to a second image. A multicolored image or even any visible image created from the content projected by the projector on to the projection surface can be faded up to a solid color that is void of an image. A first image projected on the projection surface can be faded up to form projected light that is void of an image and then faded down to reveal a second image without the distraction of a fade to black.

An example of how the fade up would work during a transition is as follows: The operator may first select a first image to be projected by a first IPLD, such as IPLD 10. The operator enters the address of the first IPLD into the keypad, such as 454 of the central controller 450 and the address is sent over the communication system such as the system including 438, 436 and 442, to IPLD 10 of FIG. 4 where it is compared with the operating address in memory 315. The operator may next select the first image to be projected by the projector 100 of IPLD 10 of FIG. 1 by sending a command and or the content over the communications system from the central controller 450. The first image may originate in the memory of the IPLD such as memory 315 of FIG. 3 or it may originate from the central controller 450 of FIG. 4 and be sent over the communications system and received by communications port 311 or 312 of the IPLD 10 The processor 316 processes the first image and sends the image to the image control 314. The image control 314 forms the pixel maps of the separate colors of the first image content and sends the first image signals to the projector 100 to be projected on the projection surface 420 of FIG. 4. If the operator wishes to next project a second image using a transition to replace the first image projected by the projector 100 of FIG. 1, the operator next sends the appropriate commands over the communications system to fade up at least one separate color of red, green or blue of the first image to project colored light substantially void of an image on the projection surface 420. The commands to fade up a separate color are sent from the central controller 450 and are received by the communication port 311 or 312 of IPLD 10. The communication port 311 or 312 forwards the commands to the processor 316 where they are operated upon by the processor 316 in accordance with the operating system data stored in the memory 315. The processor 316 forwards the appropriate command signals for the fade up of the selected separate color to the image control 314. The image control 314 responds by changing the state of one or more pixels projected on the projection surface of the separate color so as to make fully active all pixels that were partially active or inactive based upon the pixel map that was created by the first image content. The image control 314 sends the adjusted pixel signals over a video signal to the video input of the projector 100 as supplied by the wiring 146. The pixel map contained by the image control 314 of the first image separate color is modified by the image control 314 so that all the pixels become fully active. Of course the change from a first state of the pixels of the first separate colored image (where one or more of the pixels are inactive or partially active) to a second state where all pixels are fully active can be incremental based on commands sent from the central controller 450 over the communication system, such as including 438, 436 and 442, so that a pleasing fade up to a solid color void of an image can take place.

The remaining separate colors of the first image can be faded downward so that all the pixels of the other remaining colors are rendered inactive and project no substantial light upon the projection surface 420. The pixel map contained at the image control 314 of the remaining separate colors of the first image is modified by the image control 314 so that the pixels of the remaining separate colors become inactive and the appropriated video signal is sent to the projector 100 of FIG. 1. Next the operator by sending the proper commands and/or content over the communication system from the central controller 450 to the IPLD 10 selects a second image to be projected by the projector 100 of FIG. 1. The processor 316 processes the second image and sends the image to the image control 314. The image control 314 applies the second image to create a pixel map but because one of the separate colors is in the all pixels fully active state and the remaining separate colors have all their pixels in the inactive state, the second image is not yet revealed on the projection surface. The operator may next operate the central controller 450 by sending the appropriate commands over the communication system to the communications port 311 or 312 of IPLD 10 to fade down the selected separate color with all pixels fully active so that the selected separate color now has some pixels which may be inactive, some pixels which may be partially active, and some pixels which may be fully active based on the content of the second image contained in the pixel map of the image control 314. The remaining separate colors are faded up from the pixels inactive state again by sending the appropriate commands from the central controller 450 to the communications port 311 or 312 of IPLD 10 so that the remaining separate colors now may have some pixels which are inactive, some pixels which are partially active, and some pixels which are fully active based on the content of the second image contained in the map of the image control 314. This reveals the second image with all three separate colors of red, green and blue with a plurality of pixels, some of which may be in an inactive state, some of which may be in a partially active state, and some of which may be in a fully active state, without having to essentially black out the projection surface 420 during the transition.

Commands sent from the central controller 450 to alter the pixel maps of the separate colors contained at the image control 314 provide a possibility to fade up the separate colors even without a pixel map of an image created by the content. When a pixel map is not created by content the pixel map is simply a pixel map constructed of inactive pixels. The inactive pixels of the pixel map of a separate color can be controlled by commands sent from the central controller 450 to become fully active incrementally much the same as any pixel map that was constructed of content. This provides a way to control the separate colors from the central controller 450 to be projected as colored light void of an image on the projection surface 420 without having to display an image from content.

Figure 7:
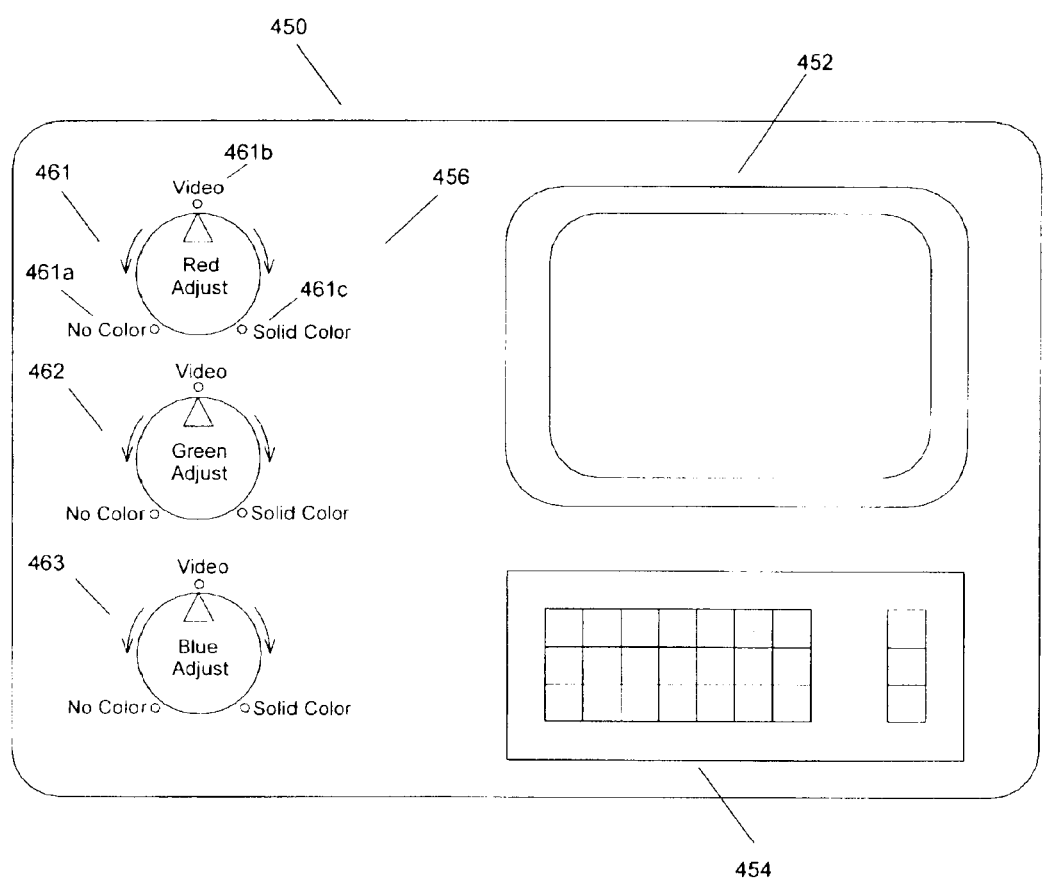
FIG. 7 shows a central controller incorporating input devices for controlling an embodiment of the present invention.

The operations on the central controller 450 that create the commands sent by the central controller 450 for fading up the separate RGB colors can be stored as cues in the central controller 450 memory and then later played back so that the fading up and down of separate colors is automated or played back. An example of an arrangement of input devices 456 to be used by an operator of the central controller 450 for fading up a separate color to project pixels on the projection surface void of an image is shown in FIG. 7. The central controller 450 may include a video display device 452 and an input keypad 454. The plurality of input devices 456 may be rotary devices or linear action devices. The input devices 456 may include input devices 461, 462 and 463 which can be used by the operator of the central controller 450 to effect adjustments to red, green and blue separate colors of a desired IPLD such as IPLD 10 or 20 of FIG. 4. The input device 461 may include a rotary knob but may be any device use to provide an adjustable range such as a linear potentiometer or a track ball. The input device 461 is used after selecting the desired IPLD to adjust substantially all of the pixels of the red separate color to inactive states, partially active states fully active states. The input device can adjust pixels from inactive, to partially active to fully active. FIG. 7 shows that the input device 461 can be rotated by an operator to gradually select "no color" 461a, which means that all pixels for the red color will be placed in an inactive state. Also by rotating the input device 461 to select 461b ("Video") the operator can incrementally fade to cause the plurality of pixels to be changed or set, so that some of the pixels may be in the inactive state, while some of the pixels will be in the partially active state, and while some of the pixels will be in the fully active state, based on the content of an image. The operator can also continue to fade up the inactive and partially active pixels not made active based upon the content of the image by rotating the input device or knob 461 to position 461c to gradually command the inactive and any partially active pixels into the fully active state shown as "solid color" so that the separate color projected on the projection surface 420 by the selected IPLD, such as 10, is void of an image projecting only the separate colored light. Input devices 462 and 463 operate in the same manner as described for 461 except they represent the separate colors of green and blue.

During operation of the central controller 450 the operator would first select a first IPLD 10 from a plurality of IPLDs (for example IPLD 10 or 20 of FIG. 4) to be controlled by the central controller 450 by first entering the address of the desired IPLD to be controlled with the input keypad 454. The address is then sent from the communications port (not shown for simplification) of the central controller 450 to be received by the plurality of IPLDs, such as 10 and 20, in the lighting system. The IPLDs compare the address sent from the central controller 450 and if it matches the operating address stored in the memory 315 of FIG. 3 then the first IPLD is ready to accept commands sent by the central controller 450. The operator by inputting to the keypad 454 sends the command over the communication system, such as including 442, 436 and 438, to select a first content that is to be projected as an image by the first IPLD, such as IPLD 10. Next the operator may decide to fade up the red separate image that is being projected by the first IPLD, such as 10. The operator of the central controller 450, shown in FIG. 7, by varying the input device 461 may incrementally fade up the red separate image of the first IPLD, such as 10, to project red colored light void of an image.

One protocol used for communications with lighting fixtures from a central controller, is DMX. The DMX protocol consists of a plurality of channels sent over the communications system from a central controller to a plurality of lighting devices. For example a particular lighting device may use twelve DMX channels to control all of its various parameters. Twenty such lighting devices may then require two hundred and forty DMX channels. Since the number of channels available under the DMX protocol is two hundred fifty-six it can easily be seen that it is best to reduce the number of channels required to change the parameters of a particular lighting device. It would be an advantage if the central controller 450 of FIG. 4 using the DMX protocol to communicate over the communications system to IPLDs 10 and 20 use a single DMX channel for each separate color (such as red, green and blue) to control the separate color pixels that project the light on the projection surface 420 controlled by input device 461. A single DMX communications channel would be used for lighting system 400 of FIG. 4 for the adjustment of one separate color of a selected IPLD such as IPLD 10 or 20 to adjust the pixels that are projected on the projection surface 420 of the separate color from projector 100 of FIG. 1. The single DMX channel would allow for the separate color pixels to be adjusted gradually from all pixels inactive (no color) to all pixels inactive, partially active or fully active based on the content material being projected (video) to all pixels fully active producing colored light void of an image (solid color).

Fading a projected image upward created by a separate color to produce projected colored light by the separate color that is void of an image on the projection surface can also be commanded with the stand alone control system of the IPLD or a hand held computer communicating to the communications ports 311 or 312 of FIG. 3.

The aspect ratio of most light valves used in video projectors such as projector 100 for FIG. 1 is 4:3. Sometimes the image on the projection surface based upon the content may be at a different aspect ratio such as a round projection aspect that is not using the full capability of the 4:3 area of the light valve. In the case for a round image being projected from a light valve that has a 4:3 aspect ratio any pixels surrounding circular projected image of light on the projection surface are not used and are inactive or "cropped". If the image to be projected as determined by the content that is sent to the image control 314 has an identifier as to its aspect ratio such as 4:3, 3:3, and round then it will not be necessary to include the inactive cropped off pixels in a fade up when responding to fade up commands for a separate color. In this way the fade up of a separate image can be done within the confines of the aspect of the separate image and a fade up of the inactive or cropped pixels that were not part of the image's aspect ratio does not occur. The aspect ratio identifier can be determined by the image control 314 of FIG. 3 or by the processor 316 so that during the fade up cropped pixels are not included because they are not used by the particular aspect ratio. The aspect ratio identifier may be determined by the processor 316 or the image control 314 by analyzing the pixels used to form the pixel map as determined by the content or by separate identifier data that accompanies the content itself. The data accompanying the content can be read by the processor 316 or the image control 314 so that the aspect ratio is determined and a fade up of a separate color only involves the pixels used for that particular aspect ratio.

I claim:

1. An image projection lighting device comprising:
   a base housing;
   a control system;
   a yoke;
   a lamp housing, wherein the lamp housing is remotely positioned in relation to the base housing by a motor;
   the base housing comprising
      a processing system;
      a first communications port;
   the lamp housing comprising
      a video projector;
      a first cooling fan;
      a transparent window aperture;
      and
      a particulate air filter; and
   wherein the video projector is comprised of
      a second cooling fan;
      an input air vent;
      a projector lens; and
      a first light valve; and
   wherein the first cooling fan causes outside air to enter the lamp housing and the outside air is filtered through the particulate air filter to form cooling air and at least a portion of the cooling air is directed to the air input vent of the projector;
   and wherein projected light from the projector lens exits from the lamp housing through the transparent window aperture and the window aperture provides a relatively airtight seal near the transparent window aperture.

2. The image projection lighting device of claim 1 wherein
   the zoom and focus values are determined by electronic position signals.

3. The image projection lighting device of claim 1 wherein
   the lamp housing further comprises an iris used to shutter the projected light exiting the projector lens before the projected light exits the transparent window.

4. The image projection lighting device of claim 1 further comprising
   a first sensor for providing a signal representative of an input air temperature;
   and a second sensor for providing a signal representative of an exiting air temperature;
   and wherein the signals are compared to determine if the particulate air filter needs service.

5. The image projection lighting device of claim 4 wherein
   the first sensor is located within the lamp housing.

6. The image projection lighting device of claim 4 further comprising
   a memory;
   wherein the input air temperature and the exiting air temperature are stored in the memory.

7. The image projection, lighting device of claim 1 wherein
   the image projection lighting device transmits via the communications port a signal when the particulate air filter needs service.

8. The image projection lighting device of claim 7 wherein
   the image projector lighting device varies a parameter observable by an operator when the particulate air filter needs service.

9. The image projection lighting device of claim 8 wherein
   the parameter as a graphic projected by the projected lens.

10. The image projection lighting device of claim 8 wherein
   the parameter is text projected by the projector lens.

11. The image projection lighting device of claim 1 wherein
   the particulate air filter substantially prevents airborne particles sized above 3 microns from entering the lamp housing as a component of the cooling air.

12. The image projection lighting device of claim 1 wherein the image projection lighting device further comprises
a multicolor video display device located within the base housing;
and wherein an operator of the image projection lighting device can use the multicolor video display device to provide a visual preview of content that can be projected by the video projector from the lamp housing;
and wherein the visual preview of content is displayed as red, green and blue separate colored images.

13. The image projection lighting device of claim 12 wherein
the multicolor video display device is a touch screen video display device.

14. The image projection lighting device of claim 12 wherein
an operator of the image projection lighting device can use the multicolor video display device to display a visible signal indicating a service alert.

15. The image projection lighting device of claim 14 wherein
the visible signal indicate a particulate air filter service alert.

16. The image projection lighting device of claim 12 wherein
the visual preview content is a video loop.

17. The image projection lighting device of claim 1 wherein
the image projection lighting device further comprises a multicolor video display device located within the base housing; and wherein
the multicolor video display device display content received by the first communications port that is sent over a communications system.

18. The image projection lighting device of claim 1
wherein the image projection lighting device is further comprised of a multicolor video display device and an input keypad both located within the base housing and
wherein the multicolored display device and the input keypad act together to form a stand alone control system and wherein the stand alone control system can be used by an operator to select content to be projected by the video projector as well as to select content to be previewed on the multicolored video display device.

19. The image projection lighting device as in claim 1 further comprising:
a second communications port; and
wherein the first communications port receives commands for controlling a function of the video projector and the commands are forwarded from the first communications port to the second communications port to control the functions of the video projector.

20. The image projection lighting device of claim 19 wherein
the function is on or off.

21. The image projection lighting device of claim 19 wherein
the function is selecting a video input.

22. The image projection lighting device of claim 21 wherein
the function is control of a lamp mode.

23. The image projection lighting device of claim 21 wherein
the function is color balance.

24. The image projection lighting device of claim 19 wherein
the projector comprises a cooling system including a fan; and
wherein the function is controlling a speed of the fan.

25. The image projection lighting device of claim 1 wherein
the image projection lighting device transmits service information concerning the video projector from the first communications port.

26. The image projection lighting device of claim 25 wherein
the service information transmitted concerns a speed of the fan.

27. The image projection lighting device of claim 25 wherein
the video projector includes a lamp which has a finite number of lamp hours; and
the service information transmitted concerns the remaining lamp hours of the lamp.

28. The image projection lighting device of claim 25 further comprising
a processing system and a memory both located in the base housing;
and wherein the processing system is operated in accordance with a first operational software stored in the memory; and
further comprising a second operational software;
wherein the second operational software operates the video projector;
and wherein the services information is located in the second operational software.

29. The image projection lighting device of claim 1 wherein
the particulate air filter is washable.

30. The image projection lighting device of claim 29 wherein
the particulate air filter is a fluorocarbon polymer filter.

31. The image projection lighting device of claim 1 wherein
the fan has a speed; and
the speed of the fan speed is variably controlled.

32. The image projection lighting device of claim 1 wherein
the video projector further comprises
a video projector housing;
wherein the projector lens is a zoom and focus lens;
the zoom and focus lens having zoom and focus values, the zoom and focus lens located at least in part within the video projector housing and at least in part within the lamp housing; and
one or more motors for controlling zoom and focus values located within the video projector housing wherein commands received by the communications port of the base housing are acted upon by the image projection lighting device to change the zoom and focus values of the zoom and focus lens.

33. An image projection lighting device comprising:
a base housing;
a yoke;
a lamp housing;

the base housing comprising
   a processing system;
   a communications port;
the lamp housing comprising
   a video projector;
   a window aperture;
   a cooling system; and
   a filter;
wherein
   the video projector projects a first image comprised of first, second, and third separate images and
   the first separate image can be projected on a projection surface and can be faded up to project light that is void of an image on the projection surface by a first command received at the communications port.

34. The image projection lighting device of claim 33 wherein
   the projected light void of an image on the projection surface can be faded down to reveal a second image projected by the video projector by a second command received at the communications port.

35. An image projection lighting device comprising:
   a base housing;
   a yoke;
   a lamp housing;
   the base housing comprising
      a processing system;
      a communications port;
   the lamp hosing comprising
      a video projector;
      a window aperture;
      a filter;
wherein
   the video projector projects a colored image on a projection surface;
   wherein the colored image is comprised of first, second, and third separate colored images and wherein any of the first, second, and third separate colored images projected on the projection surface can be faded up to form projected light that is void of an image on the projection surface by a command received at the communications port.

36. The image projection lighting device of claim 35 wherein
   each of the first, second, and third separate colored images is faded up by commands received over the communication port and three respective DMX channels are used to command the fade up of each of the three separate colors.

37. The image projection lighting device of claim 35 wherein
   the image projection lighting device is also comprised of a stand alone controller and the fade up of any of the first, second, or third separate colored images projected on the projection surface to form projected light that is void of an image on the projection surface is done by inputting commands into the stand alone control system.

38. The image projection lighting device of claim 35 wherein
   the colored image is projected in a particular aspect ratio and an aspect ratio identifier is used so that a fade up of the first, second, and third separate colored images only occurs in the confines of the particular aspect ratio.

39. The image projection lighting device of claim 38 wherein
   the first separate colored image is formed from content; and
   wherein the aspect ratio identifier is determined from identifying data that accompanies the content of the first separate colored image.

40. An image project lighting device comprising:
   a base housing;
   a yoke;
   a lamp housing;
   the base housing comprising;
      a processing system;
      the communications port;
   the lamp housing comprising
      a video projector;
      a window aperture;
      a cooling system; and
      a filter;
wherein
   the video projector projects a colored image on a projection surface comprised of first, second, and third separate colored images and wherein the first, second, and third separate colored images projected on the projection surface can be faded up together to form projected light that is void of an image on the projection surface by a command received at the communications port.

41. The image projection lighting device of claim 40 wherein
   the image projection lighting device is also comprised of a stand alone controller and the fade up of the first separate colored image on the projection surface is done by inputting commands into the stand alone controller.

42. An image projection lighting device comprising:
   a base housing;
   a yoke;
   a lamp housing;
   the base housing comprising
      the processing system;
      a communications port;
   the lamp housing comprising
      a video projector;
      a window aperture;
      a cooling system; and
      a filter;
   the video projector projects a first separate colored image on a projection surface;
   wherein the first separate colored image is comprised of a plurality of pixels, each pixel may be inactive, partially active, or fully active state, wherein the states of at least two pixels of the plurality of pixels differ;
   and the first separate colored image projected on the projection surface is faded up so that all of the plurality of pixels of the first separate colored image become substantially fully active to project the first separate color on the projection surface void of an image by commands received at the communications port.

43. The image projection lighting device of claim 42 wherein
   the first separate colored image is faded up by commands received over the communications port and a single channel is used to provide the commands.

44. The image projection lighting device of claim 42 wherein
   the first separate colored image is projected at a particular aspect ratio and the fade up occurs within a confine of that particular aspect ratio.

45. The image projection lighting device of claim 44 wherein
the confine is identified by an aspect ratio identifier.

46. The image projection lighting device of claim 45 wherein
the first separate colored image has content; and
the aspect ratio identifier is determined from the content of the first separate colored image.

47. An image projection lighting device comprising:
a base housing;
a yoke;
a lamp housing;
the base housing comprising;
the processing system;
a communications port;
the lamp housing comprising;
a video projector;
a window aperture;
a cooling system; and
a filter;
further comprising
an image control;
wherein the image control contains a first pixel map comprised of a plurality of pixels with all of the plurality of pixels inactive so as not to project a first separate colored image on the projection surface by a first separate colored light;
and wherein all of the plurality of pixels of the first pixel map are faded up by a command received over the communications port to incrementally form a second pixel map comprised of the plurality of pixels wherein all of the plurality of pixels are substantially fully active so that the first separate color projects a first separate colored light void of an image on the projection surface.

48. An image projection lighting device comprising:
a base housing;
a yoke;
a lamp housing, wherein the lamp housing is remotely positioned in relation to the base housing by a motor;
wherein the base housing is comprised of
a processing system;
and a first communications port;
wherein the lamp housing is comprised of
a projection lamp;
a light valve;
a cooling fan;
and a projection lens;
and wherein service information concerning a speed of the cooling fan is transmitted by the image projection lighting device from the first communications port to a central controller.

49. An image projection lighting device comprising;
a base housing;
a yoke;
a lamp housing;
wherein the lamp housing is remotely positioned in relation to the base housing by a motor;
the base housing comprising
a processing system;
and a first communications port;
the lamp housing comprising;
a projection lamp;
a light valve;
a cooling fan; and
a projection lens; and
wherein service information concerning operating hours of the projection lamp is transmitted by the image projection lighting device from the first communications port to a central controller.

50. An image projection lighting device comprising:
a base housing;
a yoke;
a lamp housing;
wherein the lamp housing is remotely positioned in relation to the base housing by a motor;
the base housing comprising;
a processing system;
and a first communications port;
the lamp housing comprising;
a projection lamp;
a light valve;
a cooling fan; and
a projection lens;
and a particular air filter;
and wherein service information concerning a condition of the particulate air filter is transmitted by the image projection lighting device from the the first communications port to a central controller.

51. An image projection lighting device comprising;
a base housing;
a yoke;
a lamp housing wherein the lamp housing is remotely positioned in relation to the base housing by a motor;
the base housing comprising:
a processing system;
and a first communication port;
the lamp housing comprising:
a projection lamp;
a light valve;
a cooling fan
and a projection lens;
wherein service information concerning a mode of the projection lamp is transmitted by the image projection lighting device from the first communication port to a central controller and the lamp mode may be any of on, off, economy or normal.

52. An image projection lighting device comprising:
a base housing;
a yoke;
a lamp housing;
wherein the lamp housing is remotely positioned in relation to the base housing by a motor;
the base housing comprising:
a processing system;
a memory;
and a first communications port;
the lamp housing comprising:
a projection lamp;
a light valve;
a cooling fan
and a projection lens;
wherein service information concerning a version of operating code stored in the memory is transmitted by the image projection lighting device from the first communications port to a central controller.

53. An image projection lighting device comprising:
a base housing;
a yoke;
a lamp housing wherein the lamp housing is remotely positioned in relation to the base housing by a motor;
the base housing comprising
a processing system;
a memory;
and a first communication port;
the lamp housing comprising:
a projection lamp;
a light valve;
a cooling fan;
and a projection lens;
wherein service information concerning a serial number for at least one component of the image projection lighting device is transmitted by the image projection lighting device from the first communications port to a central controller.

54. An image projection lighting device comprising:
a base housing;
a yoke;
a lamp housing, wherein the lamp housing is remotely positioned in relation to the base housing by a motor;
the base housing comprising:
a processing system;
a memory;
a communications port; and
a multicolor video display device;
the lamp housing comprising:
a projection lamp;
a light valve;
and a projection lens;
wherein the projection lamp, light valve and the projection lens are located within the lamp housing and wherein the projection lamp, the light valve and the projection lens cooperate to project light formed of a first image from the lamp housing comprised of red, green and blue separate images;
and wherein the processing system, the communications port and the multicolor video display device are located within the base housing and wherein the multicolor video display device can form a second image comprised of red, green and blue separate images to be viewed by an operator.

55. The image projection lighting device of claim 54 wherein
the multicolor video display device displays a service alert for the image projection lighting device.

56. The image projection lighting device of claim 54 wherein
the image projection lighting device is further comprised of a particulate air filter, and
the multicolor video display device displays a filter service alert, when the particulate air filter needs service.

57. The image projection lighting device of claim 54 wherein
the second image which can be formed by the multicolor video display device is a preview of content stored in the memory.

58. The image projection lighting device of claim 54 wherein
the multicolor video display device operates as a component of a stand alone control device for the image projection lighting device.

59. An image projection lighting device comprising:
a base housing;
a yoke;
a projection lamp;
a light valve;
a projection lens;
a processing system;
and a communications port
wherein the projection lens projects a first image comprised of first, second, and third separate colored images and the first separate image projected on the projection surface can be faded up to project light that is void of an image on the projection surface by a first command received at the communications port.

60. The image projection lighting device of claim 59 wherein
the projected light void of an image on the projection surface can be faded down to reveal a second image projected by the video projector by a second command received at the communications port.

61. The image projection lighting device of claim 59 wherein the image projection lighting device further comprises a multicolor video display device.

62. The image projection lighting device of claim 61 wherein
the multicolor video display device is a touch screen multicolor video display device.

63. The image projection lighting device of claim 62 wherein
the multicolor video display device displays a service alert for servicing the image projection lighting device.

64. The image projection lighting device of claim 61 wherein
the image projection lighting device is further comprised of a filter; and
the multicolor video display device displays a filter service alert when the filter needs service.

65. The image projection lighting device of claim 61 wherein
the multicolor video display device displays a preview of content.

66. The image projection lighting device of claim 61 wherein
the multicolor video display device operates as a component of a stand alone control device for
the image projection lighting device.

67. An image projection lighting device comprising:
a base housing;
a yoke;
a lamp housing;
a processing system;
a communications port;
a projection lamp;
a light valve;
and a projection lens;
wherein the projection lamp, the light valve, and the projection lens are located within the lamp housing;
wherein the projection lens projects a colored image on a projection surface comprised of first, second, and third separate colored images and wherein any of the first, second, and third separate colored images projected on the projection surface can be faded up to form projected light that is void of an image on the projection surface by a command received at the communications port.

68. The image projection lighting device of claim 67 wherein
the image projection lighting device also comprises a stand alone controller;
wherein the fade up of any of the first, second, or third separate colored images projected on the projection surface to form projected light that is void of an image on the projection surface is done by inputting commands into the stand alone controller.

69. The image projection lighting device of claim 67 wherein
the colored image is projected in a particular aspect ratio and an aspect ratio identifier is used so that a fade up of the first, second, and third separate colored images only occurs in the confines of the particular aspect ratio.

70. An image projection lighting device comprising:
a base housing;
a yoke;
a lamp housing;
a processing system;
and a communications port;
a projection lamp;
a light valve;
a projection lens; and
wherein the projection lamp, the light valve, and the projection lens are located within the lamp housing;
wherein the projection lens projects a first separate colored image on a projection surface which is comprised of a plurality of pixels, each of which may be in an inactive, partially active, or a substantially fully active state, wherein at least a first pixel of the plurality of pixels is in a different state from a second pixel of the plurality of pixels;
and wherein the first separate colored image projected on the projection surface is faded up so that all of the pixels of the plurality of pixels of the first separate color become substantially fully active to project the first separate color on the projection surface void of an image by commands received at the communications port.

71. The image projection lighting device of claim 70 wherein
the first separate colored image is faded up by commands received over the communications port and a single DMX channel is used to provide the commands.

72. The image projection lighting device of claim 70 wherein
the image projection lighting device also comprises a stand alone controller;
and wherein the fade up of the first separate colored image on the projection surface is done by inputting commands into the stand alone control controller.

73. The image projection lighting device of claim 70 wherein
the first separate colored image is projected at a particular aspect ratio and the fade up occurs within the confine of that particular aspect ratio.

74. The image projection lighting device of claim 73 wherein
the confine is identified by an aspect ratio identifier.

75. The image projection lighting device of claim 74 wherein
the first separate colored image has content;
and wherein the aspect ratio identifier is determined from the content of the first separate colored image.

76. The image projection lighting device of claim 75 wherein
the first separate colored image has content;
the aspect ratio identifier is determined from identifying data that accompanies the content of the first separate colored image.

77. An image projection lighting device comprising:
a base housing;
a yoke;
a lamp housing;
a processing system;
a communications port; and
an image control for controlling pixel maps;
a projection lamp;
a light valve;
a projection lens;
wherein the lamp housing comprises a projection lamp, a light valve, and a projection lens;
wherein the projection lens projects a first pixel map of a first separate color having all pixels inactive and the pixels of the pixel map are controlled by the image control incrementally to form a second pixel map for the first separate color of all pixels substantially fully active projecting the first separate color pixels on the projection surface to project the first separate color as light void of an image by commands received at the communications port.

78. The image projection lighting device of claim 77 wherein
each of the first, second, and third separate colored images is faded up by commands received over the communication port and via first, second, and third, respective DMX channels are used to command the fade up of each of the first, second, and third separate colors.

* * * * *